United States Patent
Bi et al.

(10) Patent No.: US 11,068,168 B2
(45) Date of Patent: Jul. 20, 2021

(54) MANAGING STORAGE PERFORMANCE CONSISTENCY WITH FEEDBACK CONTROL

(71) Applicant: Micron Technology, Inc., Boise, ID (US)

(72) Inventors: Sheng Bi, Shanghai (CN); Shi Bo Zhang, Shanghai (CN); Yiran Liu, Boise, ID (US); Yi Jun Lu, Shanghai (CN)

(73) Assignee: MICRON TECHNOLOGY, INC., Boise, ID (US)

( * ) Notice: Subject to any disclaimer, the term of this patent is extended or adjusted under 35 U.S.C. 154(b) by 53 days.

(21) Appl. No.: 16/038,108

(22) Filed: Jul. 17, 2018

(65) Prior Publication Data
US 2020/0026437 A1 Jan. 23, 2020

(51) Int. Cl.
*G06F 3/06* (2006.01)
*G06F 13/16* (2006.01)
*G06F 13/18* (2006.01)

(52) U.S. Cl.
CPC .......... *G06F 3/0613* (2013.01); *G06F 3/0604* (2013.01); *G06F 3/0631* (2013.01); *G06F 3/0653* (2013.01); *G06F 3/0685* (2013.01); *G06F 13/1663* (2013.01); *G06F 13/18* (2013.01)

(58) Field of Classification Search
CPC ...... G06F 3/0613; G06F 3/0653; G06F 13/18; G06F 3/0685; G06F 3/0631; G06F 3/0604; G06F 13/1663; G06F 2212/1044; G06F 2212/7205; G06F 12/0246; G06F 3/0659; G06F 3/0608; G06F 3/064
See application file for complete search history.

(56) References Cited

U.S. PATENT DOCUMENTS

| 9,524,118 | B2 | 12/2016 | Butterfield | |
|---|---|---|---|---|
| 2014/0101379 | A1* | 4/2014 | Tomlin | G06F 3/0608 711/103 |
| 2016/0210060 | A1* | 7/2016 | Dreyer | G06F 3/0652 |
| 2016/0313944 | A1* | 10/2016 | Hodgdon | G06F 3/061 |
| 2017/0075591 | A1* | 3/2017 | Espeseth | G06F 3/0652 |
| 2018/0300084 | A1* | 10/2018 | Kachare | G06F 3/0653 |
| 2019/0073140 | A1* | 3/2019 | Yamada | G06F 3/0616 |
| 2019/0227927 | A1* | 7/2019 | Miao | G06F 3/0658 |

* cited by examiner

*Primary Examiner* — Charles Rones
*Assistant Examiner* — Tong B. Vo
(74) *Attorney, Agent, or Firm* — Nicholson De Vos Webster & Elliott LLP (57) ABSTRACT

A method for managing storage performance consistency, where the method determines a target throughput for writes to a memory sub-system, increases a tracking variable with a granularity based on the target throughput at fixed intervals, decreases the tracking variable based on writes of host data received from a host system to the memory sub-system, and adjusts a priority of host data writes to the memory sub-system relative to writes of reclaimed data from the memory sub-system in response to the tracking variable indicating a deviation from the target throughput.

20 Claims, 5 Drawing Sheets

MANAGING STORAGE PERFORMANCE CONSISTENCY WITH FEEDBACK CONTROL

TECHNICAL FIELD

The present disclosure generally relates to managing storage performance, and more specifically, relates to using a feedback control to manage storage performance consistency.

BACKGROUND ART

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

Data stored in the memory sub-system can be organized into units of various sizes with different types of memory sub-systems having different basic units. Data stored in the memory sub-system can be distributed unevenly within the memory sub-system. Also, data can be invalidated on a basic unit basis. When new data is to be written to the memory sub-system it may be necessary to re-organize the data stored in the memory sub-system to make space for incoming data being written by a host system to the memory sub-system. The process or re-organizing of the data in the memory can cause some data to be moved to a new location. The data to be moved is referred to as reclaimed data. A garbage collection process can implement the re-organization of data and reclaim data.

In certain types of memory sub-systems, such as SSDs, reclaimed data is a by-product of the physical limitations of the technology. NAND SSDs must erase a location in the NAND SSD before new data can be written to that location. NAND SSDs have different basic units for writes and erases. A page is the term for the smallest element that can be written on a NAND SSD. A block is the term for the smallest element that can be erased in the NAND SSD. Blocks are constructed of groups of pages. The garbage collection process selects blocks to erase in order for pages of data to be written. The blocks are likely to have some valid data that must be re-written to a new location. This reclaimed data is written to a new location along with data from host, referred to as host data.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to performance consistency management in a memory sub-system. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can store data in the memory sub-system and can request data to be retrieved from the memory sub-system.

A host system seeks to send data to the memory sub-system at a specific data rate or throughput, which can be measured by various metrics. In one example, the metric is an input/output operation per second (IOPS), which is a metric of a number of input or output operations that can be carried out per second. Input/output (I/O) operations can include write operations and read operations. The term throughput is utilized herein to refer to a data rate or bandwidth of data being transferred. TOPS are utilized herein as an example of a metric for measuring throughput, however, any similar metric is applicable.

Each type of memory sub-system can have a different range of throughput capabilities that depend on the technology and architecture of the memory sub-system. The host system can request or require that the throughput for I/O operations be relatively consistent. However, memory controllers in memory sub-systems do not have a mechanism for managing the consistency of throughput. Throughput can vary in a memory sub-system dependent on the technology, host system, type of stored data and similar considerations.

Aspects of the present disclosure address the above and other deficiencies by providing a performance manager component. The performance manager component is part of a memory controller of the memory sub-system. The performance manager enables a memory controller for a memory sub-system to provide a consistent throughput, for example, a consistent target TOPS. In addition, the performance manager can adjust a target throughput based on space availability and monitored throughput in the memory sub-system. Adjustments to the target throughput are based on a feedback control. The 'feedback' of the feedback control is data representing actual throughput of the memory sub-system that is provided to or monitored by the performance manager component. The actual throughput can be determined based on writes of data to the memory sub-system such as writes of basic units as discussed further herein below.

The performance manager provides the consistent throughput in conjunction with the garbage collection process. The garbage collection process determines a source basic unit (e.g., a block) that is to be erased, identifies reclaimed data, and moves reclaimed data in source basic units to destination basic units (e.g., blocks or pages). The garbage collection process writes reclaimed data to a set of destination basic units (e.g., pages). The garbage collection process writes reclaimed data to destination basic units along with host data. The performance manager determines a ratio or mix of the reclaimed data and host data to be written to the set of destination pages. The performance manager increases a ratio of host writes to reclaimed data writes by increasing the host data priority when the rate of host data writes is below the target throughput (e.g., a target TOPS). Similarly, the performance manager decreases a ratio of host writes to reclaimed data writes when the rate of host data writes is exceeding the target throughput.

The performance manager can also adjust a target throughput, e.g., when it is not possible to maintain consistency of the target throughput regardless of the host data priority or ratio. The performance manager can adjust the target throughput when there are space constraints or when throughput significantly changes.

Figure 1:
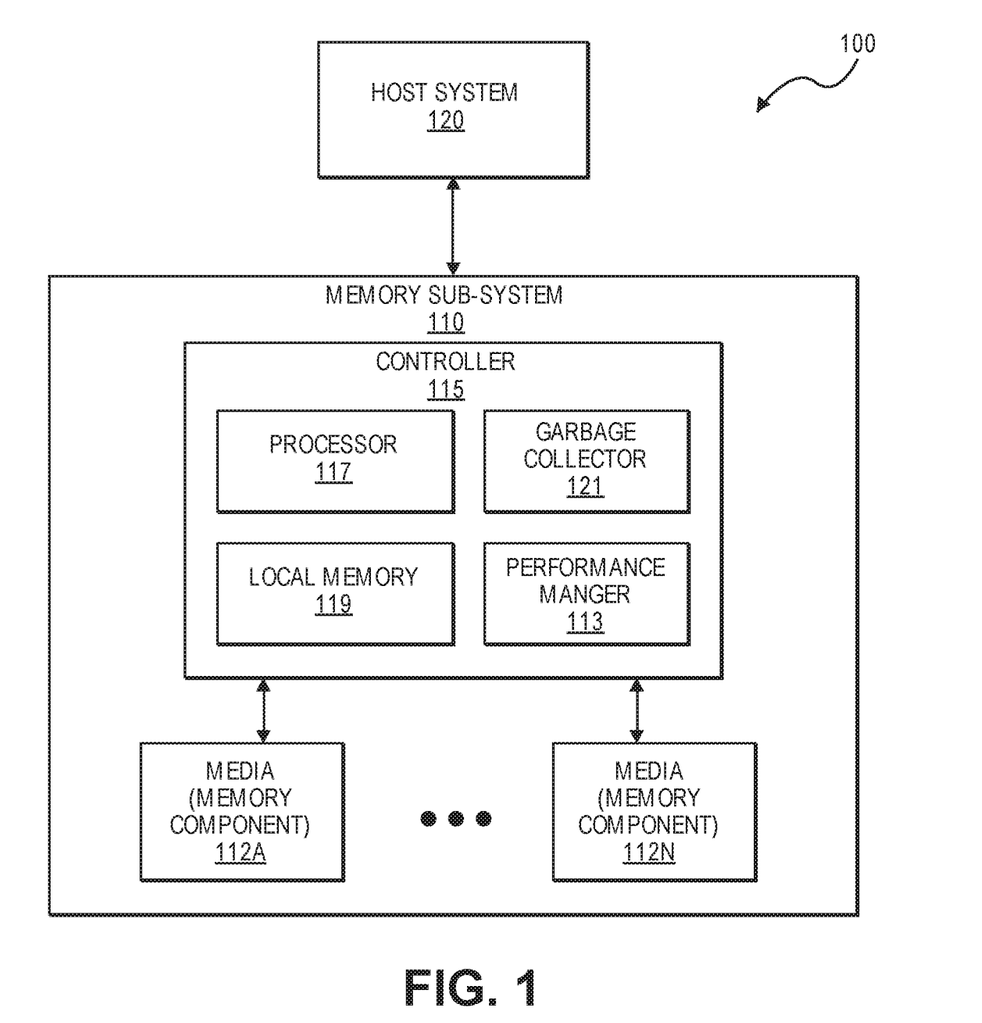
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is an SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection 121 operations, error detection and error-correcting code (ECC) operations, encryption operations, caching operations, performance management 113 operations and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N. The cache, buffer, or local memory 119 can store reclaimed data while it awaits being written to a destination basic unit.

The garbage collection 121 component is responsible for identifying blocks or similar basic units in the memory components 112A to 112N to reclaim data and to release the basic unit to be available for data to be written from the host system 120. The garbage collection 121 component can utilize any algorithm for selecting a source basic unit to erase, identify reclaimed data, and release. The garbage collection 121 component can include additional components for tracking information about the data stored in the memory components 112A to 112N. For example, the garbage collection 121 component can track the validity of blocks, pages or similar basic units in the memory components 112A to 112N. This validity information can be utilized to select blocks, pages, or similar basic units in the memory components 112A to 112N with the lowest number of valid basic units. Selecting a block or page with a minimum number of valid basic units limits the number of basic units that need to be rewritten as reclaimed data to a destination block or page. In other embodiments, the garbage collection 121 component can utilize other algorithms or criteria for identifying source basic units.

The performance manager 113 tracks the number of basic units that are invalidated, released, or written. The performance manager 113 also sets the ratio or priority of the writing of host data in relation to reclaimed data. The writes that combine host data and reclaimed data are referred to as folding operations. As described further herein below, when the performance manager 113 determines that a number of host data basic units are being written that exceeds or falls below an expected throughput level, then the performance manager 113 adjusts the ratio of host data and reclaimed data to be utilized in folding operations. The performance manager 113 seeks to provide a consistent throughput specified by a host system 120 or similar source. The consistent throughput is referred to as the target throughput. The target throughput can be described by any metric, such as TOPS. In addition, the performance manager 113 adjusts a target throughput in response to continued throughput issues and space constraints. The adjustment of the target throughput is visible to the host system 120 to enable the host system 120 to be able to send host data at an expected and consistent rate.

The controller 115 of the memory sub-system 110 is illustrated as including the performance manager 113 and garbage collection 121 component. In some embodiments, the controller 115 includes at least a portion of the performance manager 113 and garbage collection 121 component. For example, the controller 115 can include a processor 117 (processing device) configured to execute instructions stored in local memory 119 for performing the operations described herein. In some embodiments, the performance manager 113 is a discrete hardware component of the controller 115. In other embodiments, the garbage collection 121 component and/or performance manager 113 is microcode or firmware executed by the processor 117 and stored in local memory 119. In one embodiment, the performance manager 113 can be a discrete component or separate code from the garbage collector 121. In other embodiments, the performance manager 113 is integrated with the garbage collector 121. In some embodiments, the performance manager 113 is part of the host system 120, an application, or an operating system.

Figure 2:
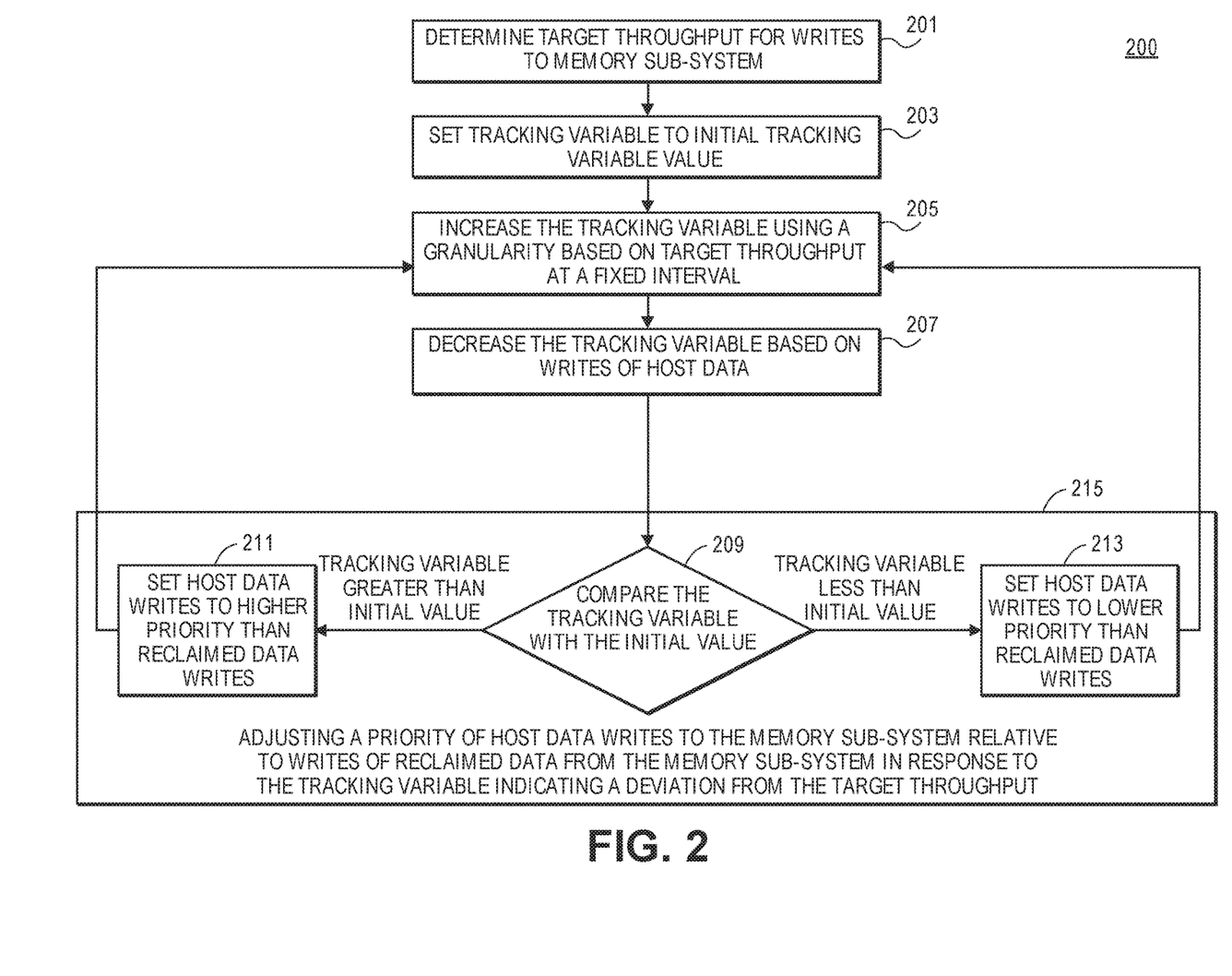
FIG. 2 is a flowchart of a process for managing performance consistency for a memory sub-system

FIG. 2 is a flowchart of a process for managing performance consistency for a memory sub-system. The performance management process 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the performance manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The performance management process 200 can start by setting a target throughput (Block 201). The target throughput can be expressed as a target TOPS. The target throughput can be set according to an input from a host system 120 or similar input source. The target throughput can be based on characteristics of the memory sub-system 110 or similar criteria. The performance management process 200 tracks the amount of host data that is written to the memory sub-system 110 using a tracking variable. The performance manager 113 sets the tracking variable to an initial value to start the tracking (Block 203). The performance manager 113 can initialize the tracking variable to any value, which will serve as a baseline for future comparisons.

At regular intervals or after fixed elapsed times, the performance manager 113 updates the tracking variable (Block 205). The performance manager 113 increases the tracking variable proportionate to the target throughput and the time elapsed. The increase to the tracking variable represents the amount of host data for the given time period that should be written in accordance with the target throughput. The amount of host data to be written can be expressed as a number of blocks, pages, flash translation units (TUs) or similar basic units. A TU is a logical unit utilized by the Flash Translation Layer (FTL) in SSDs. The performance manager 113 decreases the tracking variable as each host data write is performed (Block 207). The performance manager 113 can asynchronously update the tracking variable between host data writes and time elapsing.

The performance manager 113 can react to changes in the tracking variable over time. The performance manager 113 can adjust a priority of host data writes to the memory sub-system 110 relative to writes of reclaimed data from the memory sub-system 110 in response to the tracking variable indicating a deviation from the target throughput (Block 215). For example, the performance manager 113 can compare the tracking variable with the initial tracking variable value at regular intervals (Block 209). The comparison can be an absolute comparison to determine whether the tracking variable is less than or greater than the initial value. In other implementations, the comparison can determine whether the tracking variable has exceeded a range, threshold, or similar boundary relative to the initial tracking variable value. If the tracking variable is greater than the initial tracking variable value (either absolutely or beyond a boundary dependent on the implementation), then the performance manager 113 sets host data writes to a higher priority than reclaimed data writes or otherwise increases the priority of host data writes with respect to reclaimed data writes (Block 211). For example, the performance manager 113 can incrementally alter a ratio of host data writes to reclaimed data writes. In other implementations, the performance manager 113 can signal to the garbage collection 121 component to increase the priority of the host data writes.

If the tracking variable is less than the initial tracking variable value (either absolutely or beyond a boundary dependent on the implementation), then the performance manager sets host data writes to a lower priority than reclaimed data writes or otherwise lowers the priority of host data writes with respect to reclaimed data writes (Block 213). The performance manager 113 can incrementally alter a ratio of host data writes to reclaimed data writes. In other implementations, the performance manager 113 can signal to the garbage collection 121 component to decrease the priority of the host data writes.

The performance management process 200 has been described with an example implementation using a single tracking variable and comparing the tracking variable to an initial tracking variable value to determine deviation from a target throughput. In other embodiments, multiple variables are used to separately track writes of host data, reclaimed data, and target throughput that can be compared to make a similar assessment of target throughput deviation. The example performance management process 200 is described by way of example and not limitation.

Figure 3:
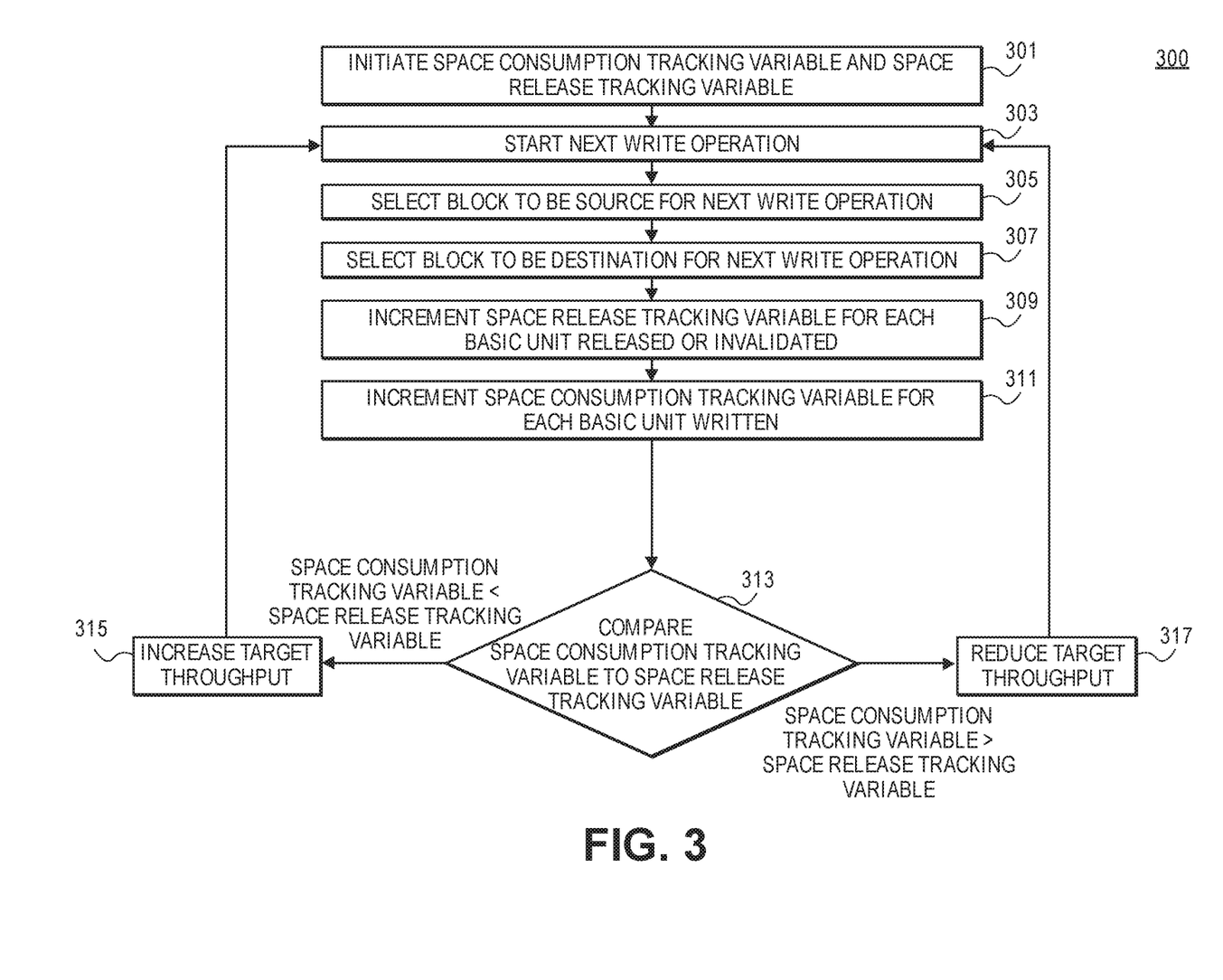
FIG. 3 is a flowchart of a process for adjusting a performance metric based on space allocation in the memory sub-system

FIG. 3 is a flowchart of a process for adjusting a target throughput based on space allocation in the memory sub-system. The space allocation management process 300 can track space consumption for the memory sub-system 110 and to adjust a target write throughput to ensure there is sufficient space available in the memory sub-system 110. The performance manager 113 implements the space allocation management process 300, e.g., in combination with the performance management process 200. In one embodiment, the space allocation management process 300 utilizes two tracking variables, a space release tracking variable, and a space consumption tracking variable. The space release tracking variable tracks the amount of free space in the memory sub-system 110. The space consumption tracking variable tracks the amount of space written to or consumed in the memory sub-system 110.

The space allocation management process 300 can start by initializing the space consumption tracking variable and the space release tracking variable (Block 301). The space consumption tracking variable and the space release tracking variable can initialize with any value. In some embodiments, space allocation management process 300 initializes these variables with a same value to enable comparisons over time to determine whether one variable is increasing relative to the other to thereby determine if space in the memory sub-system 110 is increasingly being consumed or released. In other embodiments, the space allocation management process utilizes a single tracking variable with a known initialization value, such that a value above the initialization value represents a net increase in space consumption and a value below the initialization value represents a net decrease in space consumption for the memory sub-system 110.

The space allocation management process 300 can continue by receiving a next write operation from a host system 120 (Block 303). The space allocation management process 300 selects a source for the write operation (Block 305). The source can be a block, page, TU, or similar basic unit or set of such units of data from the memory sub-system 110 or local memory 119 that store copies of data from the memory sub-system 110. The space allocation management process 300 can select data from the source to be written along with data from the host system 120 to the memory sub-system 110. The space allocation management process 300 selects a destination for the write operation. The destination can be a block, page, TU, or similar basic unit or set of such units of data from the memory sub-system 110. The destination will be the location of the next write operation, which can include basic units of host data or reclaimed data from the source. The write to the destination can include any ratio of host data and reclaimed data depending on the prioritization of each type of data, e.g., as determined and discussed herein above with regard to FIG. 2. In some embodiments, the selection of the source basic unit and the destination basic unit can be part of the garbage collection process of the garbage collector 121. In these embodiments, the performance manager 113 tracks the release and writing of basic units carried out by the garbage collector 121.

As each basic unit of data is released or invalidated in the memory sub-system 110, the performance manager 113 increments the space release tracking variable (Block 309). The space allocation management process 300 can increment the space release tracking variable for each basic unit or proportionate to the size of each basic unit. Similarly, as each basic unit of data is written to the memory sub-system 110, the performance manager 113 increments the space consumption tracking variable (Block 311). The space allocation management process 300 increments the consumption tracking variable for each basic unit written or proportionate to the size of each basic unit written to the memory sub-system 110. The updating of the space release tracking variable and the space consumption tracking variable can be asynchronous to the overall space allocation management process. For example, performance manager 113 can invalidate basic units of the memory sub-system 110 independent of host data writes.

The space allocation management process 300 at each write or at fixed intervals compares the space consumption tracking variable to the space release tracking variable (Block 313). If the space consumption tracking variable is greater than the space release tracking variable then the performance manager 113 reduces the target throughput (e.g., by reducing a target TOPS) (Block 317). The performance manager 113 can reduce the target throughput by a fixed amount or an amount proportionate to the amount that the space consumption tracking variable exceeded the space release tracking variable. If the space consumption tracking variable is less than the space release tracking variable, then performance manager 113 increases the target throughput (e.g., increasing a target TOPS) (Block 315). The performance manager 113 can increase the target throughput by a fixed amount or an amount proportionate to the amount that the space consumption tracking variable was less than the space release tracking variable. The space allocation management process C'00 can continue to adjust the target throughput in response to further write operations over time (Block 303). In other embodiments, the space allocation management process 300 may not adjust the target throughput unless the space consumption tracking variable and the space release tracking variable deviate by more than a threshold margin or where the difference exceeds defined boundaries.

Figure 4:
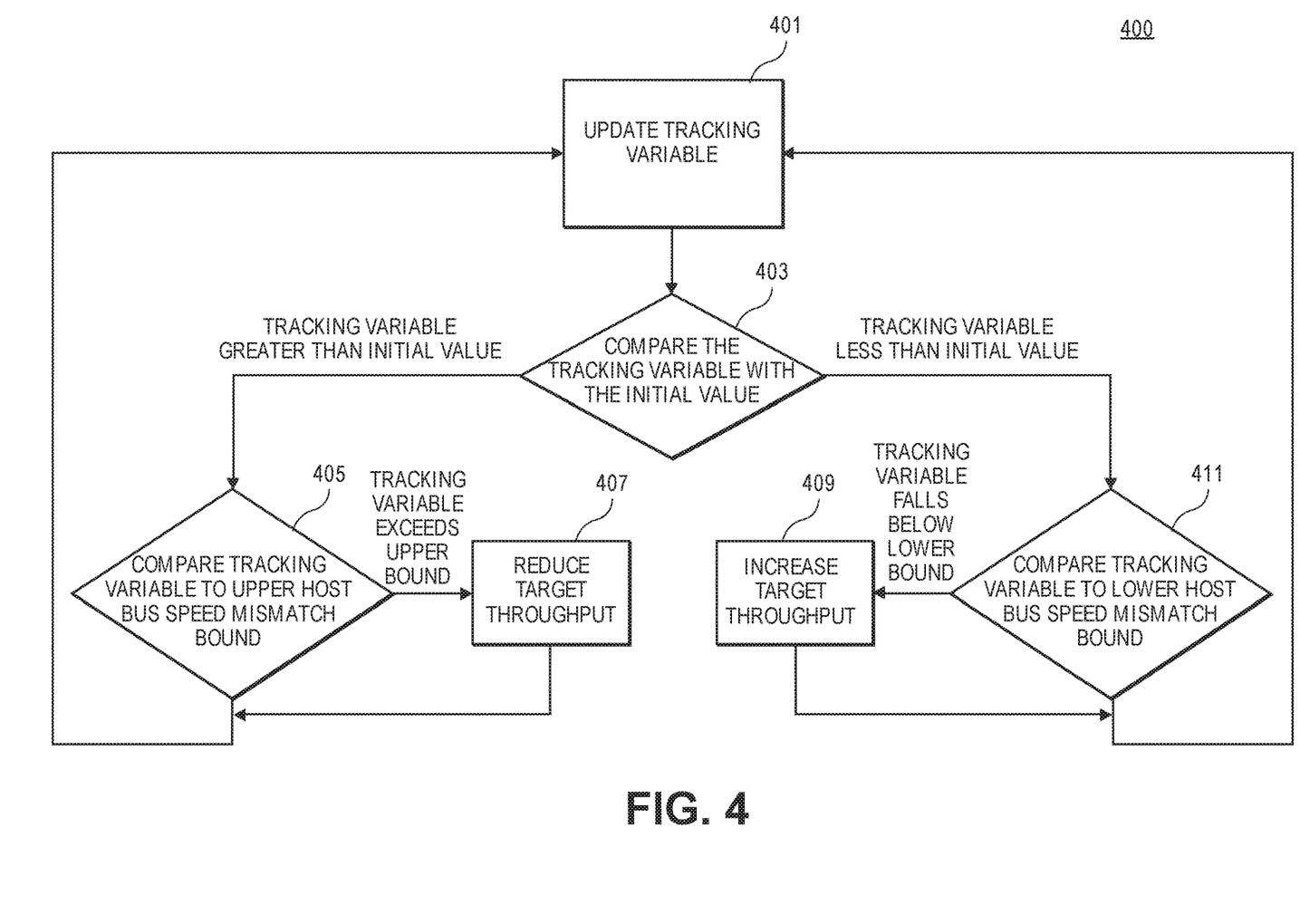
FIG. 4 is a flowchart of a process for adjusting a performance metric based on bandwidth monitoring.

FIG. 4 is a flowchart of a process for adjusting a performance metric based on throughput monitoring. In some embodiments, the performance manager 113 can implement a throughput monitoring process 400 in conjunction with or in place of the space allocation management process 300. The throughput monitoring process 400 can utilize the same tracking variable as used in the performance management process 200. The throughput monitoring process 400 can build on the performance management process 200, where the tracking variable is initialized and updated as described in relation to the performance management process 200 (Block 401). The performance manager 113 can implement the throughput monitoring process 400.

The throughput monitoring process 400 compares the tracking variable with the initial tracking variable value to determine whether the tracking variable is greater than or less than the initial tracking variable value (Block 403). In the case where the tracking variable exceeds the initial tracking variable value, the throughput monitoring process 400 compares the tracking variable to an upper host bus speed mismatch boundary (Block 405). The upper host bus speed mismatch boundary indicates the upper bound on the bus bandwidth between the host system 120 and the memory sub-system 110. If the tracking variable exceeds the upper host bus speed boundary, then the performance management process 200 cannot meet the current target throughput. As a result, the throughput monitoring process 400 reduces the target throughput (e.g., reduces the target TOPS) (Block 407).

In the case where the tracking variable is less than the initial tracking variable value, the throughput monitoring process 400 compares the tracking variable to a lower host bus speed mismatch boundary (Block 411). The lower host bus speed mismatch boundary indicates the lower bound on the acceptable bus bandwidth between the host system 120 and the memory sub-system 110. If the tracking variable exceeds the lower host bus speed boundary, then the performance management process 200 can handle a higher target throughput. As a result, the throughput monitoring process 400 increases the target throughput (e.g., increases the target TOPS) (Block 409).

The throughput monitoring process 400 can be executed at regular intervals or in response to changes in the tracking variable. In some embodiments, the target throughput can be limited or constrained at either the upper end or the lower end of a boundary as set by an administrator, the controller 115, the host system 120 or similar component of the computing environment 100. The throughput monitoring process 400 can configure intervals for throughput adjustment to be lengthened to decrease 'thrash' or continuous changes to the target throughput and dependent system settings. The throughput monitoring process 400 can shorten intervals for throughput adjustment to make the memory sub-system 110 more responsive to the bandwidth usage of the host system 120.

Figure 5:
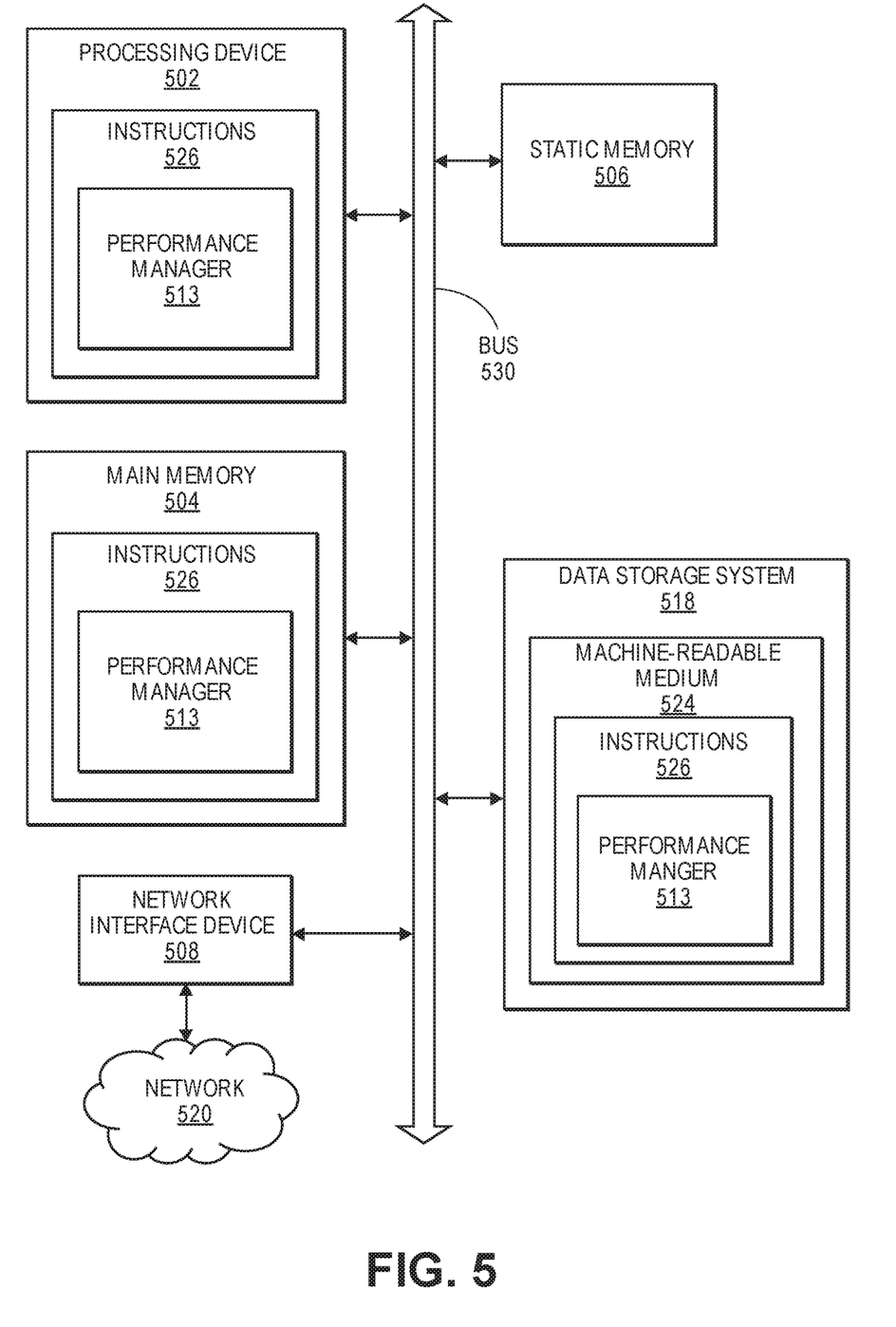
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the performance manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. In one embodiment, the instructions 526 can include instructions for the performance manager 113 and related functions. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a performance manager (e.g., the performance manager 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. For example, a computer system or other data processing system, such as the controller 115, may carry out the computer-implemented methods in response to its processor executing a computer program (e.g., a sequence of instructions) contained in a memory or other non-transitory machine-readable/computer-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for managing storage performance consistency, the method comprising:
    determining a target throughput for host data writes to a memory sub-system;
    increasing an initial value of a tracking variable with a granularity based on the target throughput for a first interval;
    decreasing a current value of the tracking variable based on writes of host data received from a host system to the memory sub-system in the first interval;
    increasing the current value of the tracking variable with the granularity based on the target throughput for a second interval, where the first interval and the second interval are equal length fixed elapsed periods of time;
    decreasing the current value of the tracking variable based on writes of the host data received from the host system to the memory sub-system in the second interval; and
    adjusting a priority of the host data writes to the memory sub-system relative to a priority of reclaimed data writes from the memory sub-system in response to the tracking variable indicating a deviation from the target throughput, the priority of the host data writes to be adjusted based on a comparison of the current value of the tracking variable to the initial value of the tracking variable.

2. The method of claim 1, wherein the comparison of the current value of the tracking variable to the initial value of the tracking variable value determines the deviation from the target throughput, where the granularity is a value proportionate to an amount of the host data to be written to the memory sub-system to obtain the target throughput.

3. The method of claim 2, wherein adjusting the priority further comprises:
    increasing the priority of the host data writes relative to the priority of the reclaimed data writes in response to the current value of the tracking variable being greater than the initial value of the tracking variable.

4. The method of claim 2, wherein adjusting the priority further comprises:
    decreasing the priority of the host data writes relative to the priority of the reclaimed data writes in response to the current value of the tracking variable being less than the initial value of the tracking variable.

5. The method of claim 1, further comprising:
    increasing the target throughput in response to a space consumption tracking variable being less than a space release tracking variable.

6. The method of claim 1, further comprising:
decreasing the target throughput in response to a space consumption tracking variable being greater than a space release tracking variable.

7. The method of claim 1, further comprising:
adjusting the target throughput in response to the tracking variable exceeding an upper or lower bound of a host bus mismatch boundary.

8. A non-transitory computer-readable storage medium comprising instructions that, when executed by a processing device, cause the processing device to:
determine a target throughput for host data writes to a memory component,
increase an initial value of a tracking variable with a granularity based on the target throughput for a first interval,
decrease a current value of the tracking variable based on writes of host data received from a host system to the memory component in the first interval,
increase the current value of the tracking variable with the granularity based on the target throughput for a second interval, where the first interval and the second interval are equal length fixed elapsed periods of time,
decrease the current value of the tracking variable based on writes of the host data received from the host system to the memory component in the second interval, and
adjust a priority of the host data writes to the memory component relative to a priority of reclaimed data writes from the memory component in response to the tracking variable indicating a deviation from the target throughput, the priority of the host data writes to be adjusted based on a comparison of the current value of the tracking variable to the initial value of the tracking variable.

9. The non-transitory computer-readable storage medium of claim 8, wherein the comparison of the current value of the tracking variable to the initial value of the tracking variable value determines the deviation from the target throughput, where the granularity is a value proportionate to an amount of the host data to be written to the memory component to obtain the target throughput.

10. The non-transitory computer-readable storage medium of claim 9, wherein the processing device is further to:
increase the priority of the host data writes relative to the priority of the reclaimed data writes in response to the current value of the tracking variable being greater than the initial value of the tracking variable.

11. The non-transitory computer-readable storage medium of claim 9, wherein the processing device is further to:
decrease the priority of the host data writes relative to the priority of the reclaimed data writes in response to the current value of the tracking variable being less than the initial value of the tracking variable.

12. The non-transitory computer-readable storage medium of claim 8, wherein the processing device is further to:
increase the target throughput in response to a space consumption tracking variable being less than a space release tracking variable.

13. The non-transitory computer-readable storage medium of claim 8, wherein the processing device is further to:
decrease the target throughput in response to a space consumption tracking variable being greater than a space release tracking variable.

14. The non-transitory computer-readable storage medium of claim 8, wherein the processing device is further to:
adjust the target throughput in response to the tracking variable exceeding an upper or lower bound of a host bus mismatch boundary.

15. A system comprising:
a memory component; and
a processing device, coupled to the memory component, configured to execute a performance manager for managing storage performance consistency, the performance manager to:
determine a target throughput for host data writes to a memory sub-system,
increase an initial value of a tracking variable with a granularity based on the target throughput for a first interval,
decrease a current value of the tracking variable based on writes of host data received from a host system to the memory sub-system in the first interval,
increase the current value of the tracking variable with the granularity based on the target throughput for a second interval, where the first interval and the second interval are equal length fixed elapsed periods of time,
decrease the current value of the tracking variable based on writes of the host data received from the host system to the memory sub-system in the second interval, and
adjust a priority of the host data writes to the memory sub-system relative to a priority of reclaimed data writes from the memory sub-system in response to the tracking variable indicating a deviation from the target throughput, wherein the performance manager adjusts the priority of the host data writes based on a comparison of the current value of the tracking variable to the initial value of the tracking variable.

16. The system of claim 15, wherein the performance manager increases the priority of the host data writes relative to the priority of the reclaimed data writes in response to the current value of the tracking variable being greater than the initial value of the tracking variable.

17. The system of claim 15, wherein the performance manager decreases the priority of the host data writes relative to the priority of the reclaimed data writes in response to the current value of the tracking variable being less than the initial value of the tracking variable.

18. The system of claim 15, wherein the performance manager is further to increase the target throughput in response to a space consumption tracking variable being less than a space release tracking variable.

19. The system of claim 15, wherein the performance manager is further to decrease the target throughput in response to a space consumption tracking variable being greater than a space release tracking variable.

20. The system of claim 15, wherein the performance manager is further to adjust the target throughput in response to the current value of the tracking variable exceeding an upper or lower bound of a host bus mismatch boundary.

* * * * *